Figure 1:
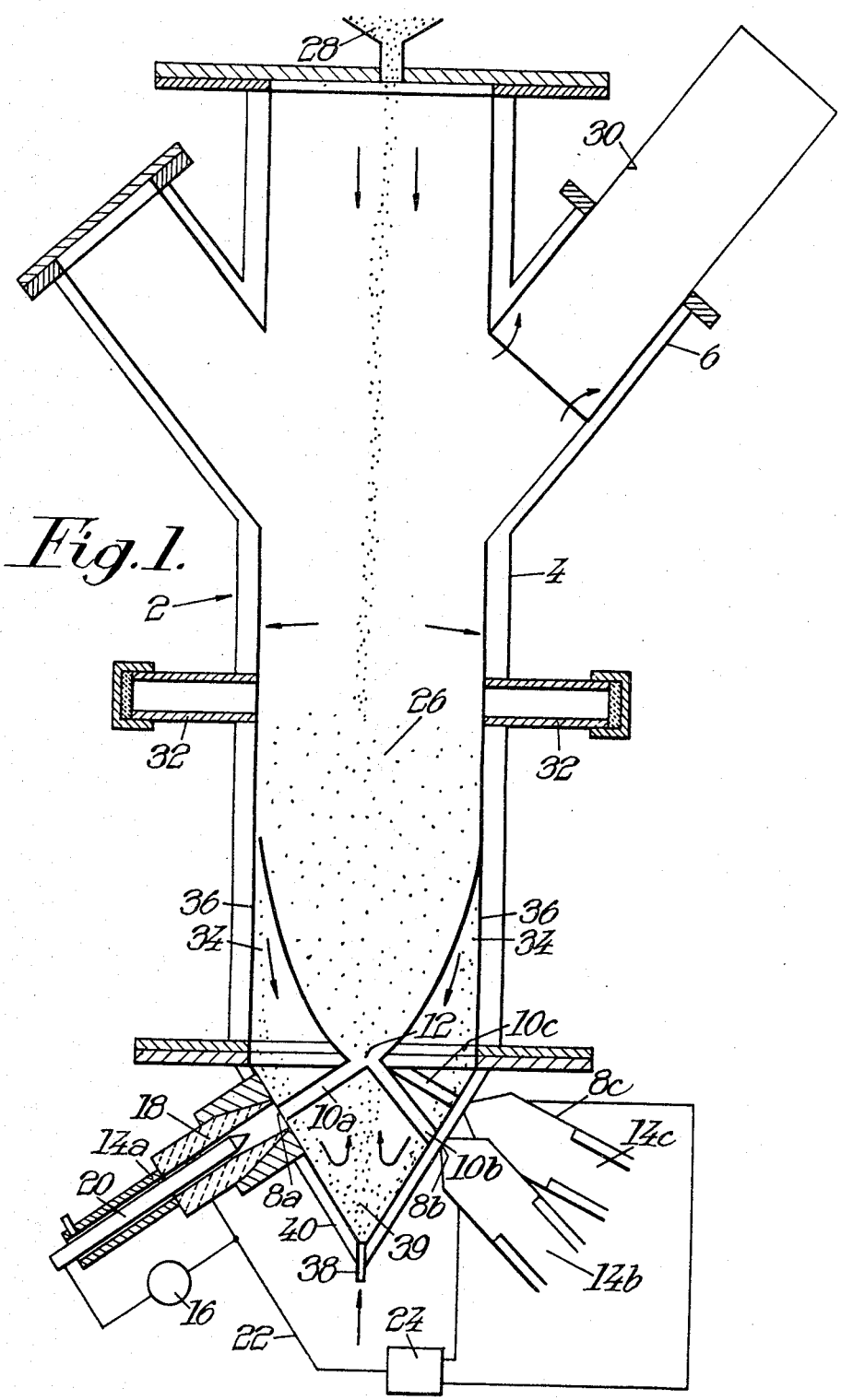

United States Patent [19]
Bonet et al.

[11] 3,923,467
[45] Dec. 2, 1975

[54] PRODUCTION OF ULTRA FINE REFRACTORY PARTICLES FROM REFRACTORY MATERIAL USING PLASMA FLOWS AND A FLUIDIZED BED

[75] Inventors: Claude Bonet, Montlouis; Marc Foex, Paris, both of France

[73] Assignee: Agence Nationale de Valorisation de la Recherche (ANVAR), Courbevoie, France

[22] Filed: Dec. 28, 1971

[21] Appl. No.: 213,052

[30] Foreign Application Priority Data
Jan. 6, 1971    France ............................. 71.00184

[52] U.S. Cl. .................. 23/293 A; 23/294; 23/305; 204/164; 219/75
[51] Int. Cl.² .. B01D 5/00; C01G 25/02; B01D 7/00
[58] Field of Search ................. 23/294, 293 A, 305; 204/164; 219/75

[56] References Cited
UNITED STATES PATENTS

| | | | |
|---|---|---|---|
| 3,429,665 | 2/1969 | Evans et al. ........................ | 23/294 |
| 3,431,074 | 3/1969 | Jordan ............................... | 204/164 |
| 3,524,496 | 8/1970 | Barnes ................................ | 23/294 |
| 3,532,462 | 10/1970 | Zirngibl et al. ...................... | 204/164 |
| 3,596,040 | 7/1971 | MacDonald .......................... | 23/301 |

FOREIGN PATENTS OR APPLICATIONS

| | | | |
|---|---|---|---|
| 1,469,629 | 1/1967 | France ................................ | 219/75 |
| 277,436 | 3/1965 | Australia ............................. | 23/294 |

Primary Examiner—Jack Sofer
Assistant Examiner—S. J. Emery
Attorney, Agent, or Firm—Larson, Taylor and Hinds

[57] ABSTRACT

The device is especially adapted to the partial vaporisation of powdered refractory materials and comprises a vertical enclosure with an exhaust opening to the outside in its upper portion. In its lower portion orientable nozzles provide convergent elementary flows of plasma traversable by an electric current to generate the principal flow of plasma with a flared shape. Above the convergent point of the elementary flows, the cross-section of the principal flow reaches a value equal or close to the internal cross-section of the enclosure. A funnel introduces the powders by gravity into the principal flow. Injectors of cold gas into the enclosure above the principal flow and cooling means for the walls can be included.

9 Claims, 2 Drawing Figures

PRODUCTION OF ULTRA FINE REFRACTORY PARTICLES FROM REFRACTORY MATERIAL USING PLASMA FLOWS AND A FLUIDIZED BED

The invention relates to a method and to a device for the thermal treatment, especially with vaporisation of refractory materials and it relates more particularly, because it is in this case that its application seems to have the most advantage, but not exclusively, to a method and a device for the treatment of fairly coarse powders of refractory materials for the purpose of obtaining fine powders of predetermined granulometries for ultra-fine powders.

It is known that prior methods are hardly satisfactory, taking into account the high temperatures at which it is necessary to operate, especially if it is desired to have recourse to vaporisation and condensation of the refractory materials.

It is already be proposed, to achieve this, to inject the initial powders of refractory materials into plasma jets. The particles however do not stay for sufficient time in the plasma jet to be melted or vaporised, even if the heart of the plasma jet is at a very high temperature, in view of the extreme velocity of the gases of the jets. It has also been proposed to form an electric arc between two electrodes placed in the midst of a fluidised mass of the refractory material to be vaporised. This method which enables, to a certain extent, the obtaining of spheroidisation of the particles, cannot be controlled in a satisfactory fashion. Similarly the injection of a plasma jet into a fluidised bed cannot lead to the anticipated result. There would rather be a tendency to obtain the reverse effect, namely the tempering of the gases of the plasma in contact with the fluidised bed, which has generally a considerable heat capacity.

It is an object of the invention to take advantage of the possibility of obtaining very hot gases by means of the formation of plasma and the techniques of fluidisation of the particles to keep the latter in suspension in the hot gases for a sufficient time for the at least partial vaporisation of these particles, hence to have recourse, to obtain the desired result, to two techniques which hitherto seemed to be incompatible.

The invention consists — to obtain an at least partial vaporisation of powders of refractory materials — of a method consisting in making converge into the lower portion of a vertical enclosure, whose walls are, preferably, cooled, elementary flows of plasma traversed by an electric current and emerging from nozzles placed in the proximity to the bottom of the enclosure, in bringing this powder above the convergent point of these elementary flows and of adjusting the angles formed by the directions of the elementary flows, the flow rates of these flows and the electric power dissipated into the latter, so as to form a principal flow flared upwardly and of sufficiently reduced speed to obtain fluidisation of the powder introduced into the principal flow.

The invention consists also of a device for the at least partial vaporisation of these powders of refractory materials, comprising an enclosure with vertical axis, whose walls are, preferably, cooled and which have, in its upper portion, an exhaust opening towards the exterior, this device being characterised by the fact that the enclosure comprises, in its lower portion, oriented or orientable nozzles adapted to supply convergent elementary plasma flows and adapted to be traversed by an electric current, these elementary flows giving rise to the formation of a principal plasma flow with a flared shape of which the cross-section reaches, above the convergent point of the elementary flows, a value close or, preferably, equal to the internal cross-section of the enclosure, and means to introduce the said powders in this principal flow.

There as already been described, especially in the French Pat. No. 1,469,629 and in the application for the first addition No. 45,218 to this patent filed on Nov. 7 1966, and again in French Pat. No. 1,600,268 and in the application of the first certificate of addition No. 70,46416 to this patent filed Dec. 23 1970, devices which enable the obtaining, from convergent elementary plasma flows, of a principal flow whose orientation and shape can be adjusted by modifying, especially, the parameters of the installations concerned which are the angles formed between the elementary flows themselves, the gaseous flow rates in these flows and the electrical energy dissipated in the latter.

These installations can be constituted by several plasma torches each being provided with an autonomous supply, one of the electrodes of each of these torches being moreover inserted in a electric circuit, supplied by a common generator and capable of being closed through the elementary flows, as soon as each of the plasma torches of the installation has been ignited.

The plasma torches of the above-indicated installation can even be replaced by nozzles devoid of their own electrical supply but each comprising a conductive portion in contact with the corresponding flows, the conductive portions of all these nozzles being inserted in a circuit, normally open, comprising a common device for the supply of electric current and capable of being closed by means of these flows, on the production in the latter of a sufficient reduction in their electrical resistance.

Whatever the type of installation contemplated, it is therefore possible, when the plasma torches or nozzles concerned are arranged inside or within the walls of the enclosure, in the lower portion of the latter, to obtain above the convergence point of these flows, a principal flow not traversed by an electric current and resulting from the convergence of the elementary flows, this principal flow having, at least at a certain distance from the convergence point of the elementary flows, a cross-section which is close to, or even becomes equal, or tends to become greater then, to the internal cross-section of the enclosure.

Hence there may will be in this principal flow, especially in its portions of large cross-sections, a sufficient reduction of the flow velocity of the hot gases for the particles of powders injected into this flow to be maintainable there in the fluidised state. The invention hence enables the obtaining of a true fluidised bed of the material to be treated, of which the fluidising gas is constituted by the hot gases alone of the principal flow. This fluidised bed has also particular characteristics which show themselves to be of considerable advantage, especially in the case of the preferred application of the invention. Considering, in fact, that the temperature of the hot gases in the flow diminishes from below to above, the average speed of flow of the plasma diminishes equally from below to above. It will also be the same for the viscosity of the fluid which diminishes in moving from below to above in the enclosure. The maximum speed of the fluidisation (maximum velocity of injection of the fluidising gas into a fluidised bed of uniform temperature beyond which fluidisation can no longer be maintained) which is inversely proportional to the viscosity of the fluid tends consequently to increase and this in very large proportions, in moving from below to above in the enclosure.

Particles of initial materials injected into the upper portion of the enclosure, especially into the least heated zone of the principal flow, tend, due to the fact of the very high maximum velocity of fluidisation at the corresponding place, to drop in the hot zones where the maximum velocity of fluidisation will be less, so that there will be observed a zone in which the fluidising bed formed by these particles will tend to be stabilized.

If account is taken, moreover, of the fact that, all other conditions being otherwise the same, the maximum speeds of fluidisation vary in the same sense as the granulometry of the particles of the fluidised bed, it will be seen that only the vapors of refractory materials or extremely fine particles of the refractory material for which the maximum velocity of fluidisation is less than the velocity of flow of the gases, even in the least heated portion of the principal flow, could be evacuated, at the upper end of the enclosure, especially towards a device for the condensation and if necessary separation of the particles.

Lastly, the fact that the plasma is a heterogenous medium from the point of view of local temperatures and speeds of flow, does not appear to spoil the efficiency of fluidisation. In fact, the ratio of the maximum speeds of fluidisation to the minimum speeds of fluidisation in the principal flow of plasma is sufficiently high for the heterogeneities of temperatures not to cause, in certain zones, movements of the whole of the fluidising bed corresponding either to decantation, or to drawing of the powder under treatment from the bed. Such thermal gradients appear, on the contrary, to favor the movement of particles and their mixing into the principal flow of plasma and, consequently, to improve the quality of heat transfers.

If the walls of the enclosure are cooled, a portion of the vapors formed will be condensable on the walls and the bottom of the enclosure. It will also be observed that a portion of the powder under treatment tends to leave the fluidised bed and to flow towards the bottom of the enclosure, along its walls.

According to an advantageous supplementary feature of the method according to the invention, recourse is profitably had to the injection of an auxiliary gaseous current into the bottom of the enclosure, at a flow rate adapted to entrain or re-entrain into the fluidised bed the particles deposited or which are being deposited in the bottom of the enclosure.

This auxiliary current of gas which, if necessary, can be constituted itself by a flow of plasma, can in particular be rendered convergent, with the elementary flows emerging from the aforesaid nozzles.

A particularly efficient injection of the particles deposited or which are being deposited in the bottom of the enclosure is obtained if this bottom has a substantially conical or similar surface, the point of the cone being oriented downwardly, the injection of the auxiliary gaseous flow being effected at the level of the point of the cone.

Recourse to this auxiliary gaseous current is of very particular advantage, in the case of effecting discontinuous treatment operations of refractory materials as powder and when the charge to be treated is introduced into the bottom of the enclosure. The auxiliary gaseous current then produces a mixing of this powder and entrains it progressively to the inside of the principal flow where the fluidised bed is created. In a particularly advantageous embodiment of the invention and in the case where a continuous thermal treatment is carried out, recourse will advantageously be had to supply of the enclosure by gravity, the gaseous auxiliary current then serving essentially to re-inject into the fluidised bed the material which has escaped by flow along the walls of the enclosure.

In the case of the preferred application of the invention which contemplates the obtaining of a powder of a very fine granulometry, from an initial powder of fairly coarse granulometry, the fluidizing plasma will have to be constituted by a gas inert with respect to the refractory material.

It will be self-evident that care must be taken, especially on effecting a continuous vaporisation of refractory materials, to adjust the continuous flow rate of the introduction of powder into the fluidised bed as a function of the heat energy dissipated into the principal flow, especially so as not to exceed the flow rates for introduction of powder which would produce too considerable a cooling of the principal flow, hence would slow it down, then even interrupt the vaporisation process.

The invention will in any case be well understood by means of the complement of description which follows, as of the accompanying drawings, which complement and drawings are, of course, given purely by way of non-limiting example.

Figure 2:
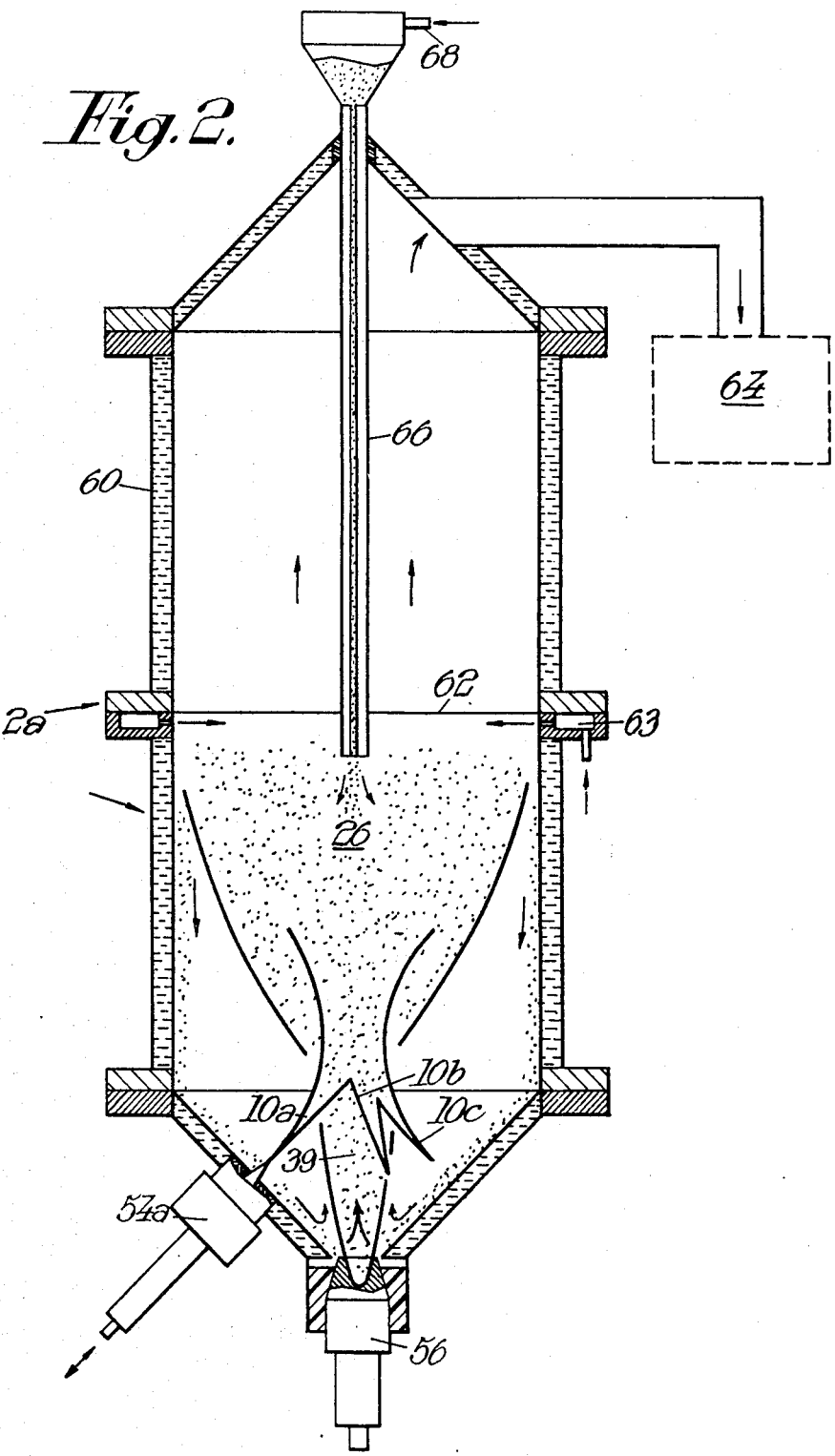

In the drawings,

FIGS. 1 and 2 show diagrammatic cross-sections of embodiments of installations according to the invention for producing vaporisations of refractory materials.

There is shown in diagrammatic manner in FIG. 1 the device which was used in the experimental trial which will be described below, which device comprises an enclosure 2 with cooled walls 4 and comprising, in its upper portion, at least one opening for exhaust 6 towards the outside, this device being more particularly characterised by the fact that it comprises in its lower portion nozzles 8a, 8b, 8c oriented or orientable so as to provide laminar elementary flows 10a, 10b, 10c of a plasmagenic gas converging at a point 12. In the embodiment shown in FIG. 1, the nozzles concerned are constituted by three plasma torches 14a, 14b, 14c shown in diagrammatic manner, each of these torches comprising its own supply 16 as has been shown in diagrammatic manner for the torch 14a, this autonomous supply enabling the application of a potential difference sufficient to support an electric arc between the anodes 18 and the the cathodes 20 of these plasma torches. In the embodiment shown in FIG. 1, the anodes 18 of the three plasma torches are inserted in a circuit 22 comprising a three-phase current generator 24, this circuit 22 being adapted to be closed through the elementary flows 10a, 10b, 10c produced by the three plasma torches.

As has been particularly described in French Pat. No. 1,469,629 and the application for certificate of addition no. 82,765 already mentioned, the flow rates of these plasma torches, the angles they form with their elementary flows, the power dissipated in each of them, are adjusted so that there is obtained a main flow 26 of which the shape is flared to have, at a certain distance above the convergence point 12, a cross-section equal to the internal cross-section of the enclosure 2.

The supply of the enclosure can be effected by gravity, as shown in FIG. 1. The powder to be vaporised is introduced by means of a hopper or a funnel 28 placed in the upper portion of the enclosure, the grains of powder being thus brought to fall into the flared portion of the principal flow 26 in which there is then formed a fluidised bed of particles. The particles contained in this hot fluidised bed are vaporised, the vapors and, possibly, the particles, once the latter have undergone a sufficient reduction of volume for the relative maximum fluidisation speeds to become less than the speed of flow of the gases of the principal flow, being evacuated through the opening 6 formed in the upper portion of the enclosure. This opening 6 can be connected to a separator. In the trial which will be described below, recourse was had to a fairly long fractionating column 30 of which the walls were cooled to encourage the condensation of the vapors.

Observation ports 32 enable the checking of the fluidised bed, especially of its movements in the enclosure, which could possibly necessitate correction of the flow rates of the plasmagenic gas of the torches or of the flow rate of the gravity supply to the enclosure of the powder to be treated.

In order to recycle particles 34 which flow along the inner walls 36 of the enclosure and are deposited in the bottom of the latter, recourse is had to an injection of an auxiliary gaseous current 39, by means of a nozzle shown diagrammatically at 38 in FIG. 1, in the bottom of the enclosure. This auxiliary gaseous current is oriented so as to converge with the elementary flows 10a, 10b, 10c and its flow rate is adjusted so as to re-entrain the particles being deposited in the bottom of the enclosure, again to the inside of the fluidised bed formed in the principal flow 26. In a preferred embodiment of the invention, the bottom of the enclosure has the shape of a cone 40 of which the point is oriented downwardly, the injector 38 opening into the inner space of the enclosure, at the point of the cone 40.

Apart from this injector 38 enabling continuous recycling of the particles falling into the bottom of the enclosure, it will also be usable as a vehicle for the particles to be treated in the case of effecting discontinuous operations in which, before the starting of the plasma torches, there has been a prior loading of the bottom of the enclosure with the material to be treated. In this case, the flow rate of the injector 38 must be adjusted so as to entrain progressively the whole of the powder to be treated inside the principal flow 26, to form the desired fluidised bed. The discontinuous treatment operation is stopped when a fraction or the whole of the powder initially charged into the enclosure is vaporised.

However there is preferably, in a general way, reliance on continuous treatment, using a continuous supply of powder, for example by gravity, or even by injection of powder into the gaseous auxiliary current 39, since it enables the preservation in the fluidised bed of a quantity of powder which can be held approximately constant. In addition, the yield of vaporisation is substantially constant in the course of the experiment. It is on the other hand variable and decreasing in the case of discontinuous processing.

In order to further illustrate the invention, of course in a non-limiting manner, there will be described below vaporisation trials of a zirconia initial powder, whose initial granulometries are shown in the Table I below, in the apparatus which has just been described.

TABLE I

| Granulometry of zirconia before treatment: | | |
|---|---|---|
| Diameter of the grains | | Percentage by weight |
| <80µ | | 0.1 |
| 80µ | — 125µ | 2.1 |
| 125µ | — 200µ | 6.2 |
| 200µ | — 215µ | 13 |
| 315µ | — 500µ | 26 |
| 500µ | — 800µ | 33.6 |
| 800µ | — 1250µ | 19 |
| | | 100 |

Trial of vaporisation of zirconia in discontinuous operation

In a first trial, a discontinuous processing operation was carried out on a mass of 150 g of the said zirconia powder.

The characteristics of the device were as follows
diameter of the enclosure: 250 mm
nominal power of each of the three torches 10a, 10b, 10c: 12 kW (autonomous supply of 600 A at 20 V)
flow rate of argon of each of the torches: 15 l/mm
cross-section of the ejection orifice of each of the torches: 6 mm
angles formed by their elementary flows with respect to a horizontal plane: 45° (the three torches are arranged at angles of 120° with respect to one another).

The nominal power of each of the torches becomes 11.2 kW (560 A at 20 V) when the arcs are started in the elementary flows 10a, 10b, 10c which close the electrical circuit 22 supplied by the triphase current generator 24. The latter then yields a power of 38.5 kW ($\sqrt{3} \times 140$ V $\times 160$ A).

flow rate of argon of the auxiliary current of the injector 38 : 50 l/mm.

The fluidisation of the vaporised material is then capable of being started.

A processing trial for 100 seconds was carried out on the 150 g of powdered zirconia which had previously been charged into the bottom of the enclosure. At the end of this trial, there were recovered in the bottom of the enclosure 100 g of powder which had not been vaporised, 20 g of powder of extremely fine granulometry on the walls of the enclosure, this powder resulting from the condensation on the cooled walls of the zirconia vaporised in the fluidised bed. Finally, 30 g of zirconia were removed to the outside in the form of vapor and collected outside in the form of extremely fine condensation particles.

CONTINUOUS VAPORISATION TRIAL OF ZIRCONIA

In a continuous processing trial, 1150 g of the same zirconia powder were treated in the apparatus of FIG. 1. The plasma torches occupy the same relative positions as in the preceding case. Their operational characteristics and the value of the various parameters of the installation are the following:
diameter of the enclosure: 250 mm
continuous power, supplied by autonomous supplies 16 of each of the torches 14a, 14b, 14c: 12 kW (600 A × 20 V)
average maximum power of the three-phase alternating current: 54 kW ($\sqrt{3} \times 175$ V $\times 180$ A)

flow rate of argon of each of the torches 14a, 14b, 14c: 170l l/mn cross-section of the ejection orifice of each of the torches: 6 mm flow rate of argon on the injector of the auxiliary gaseous current: 50 l/mn duration of the trial: 5 mn initial charge of powder in the bottom of the enclosure: 150 g average flow rate of powder introduced by gravity: 3.3 g/s.

In order to collect easily the large fraction of vaporised powder escaping through the aperture 6, recourse is had to a cylindrical column 30 of 150 mm of diameter and 120 cm length.

After the trial the following fractions were collected:

85 g of powder condensed in the column 30, 90 g of powder condensed on the walls of the enclosure in which the fluidised bed was produced, 740 g in the recovery cone.

There can finally be collected outside, the remaining 235 g of zirconia which have escaped in the vapor state, in the form of ultra-fine condensation powder.

The granulometric analysis of the condensate in the column 30 and of the fractions collected are shown in the Table II below.

TABLE II

Condensate in the column

| Diameter of the grains | | Percentage by weight |
|---|---|---|
| From 1250$\mu$ to | 800$\mu$ | 2 |
| 800$\mu$ | 500$\mu$ | 6 |
| 50$\mu$ | 315$\mu$ | 8.1 |
| 315$\mu$ | 200$\mu$ | 8.8 |
| 200$\mu$ | 125$\mu$ | 8.1 |
| 125$\mu$ | 100$\mu$ | 4 |
| 100$\mu$ | 40$\mu$ | 48 |
| 40$\mu$ | 10$\mu$ | 15 |
| | | 100 |

Condensate on the walls of the cylinders

| Diameter of the grains | | Percentage by weight |
|---|---|---|
| From 200$\mu$ to | 125$\mu$ | 1.3 |
| 125$\mu$ | 100$\mu$ | 2.2 |
| 100$\mu$ | 40$\mu$ | 15.0 |
| 40$\mu$ | 10$\mu$ | 81.5 |
| | | 100 |

Fraction remaining in the recovery cone

| Diameter of the grains | | Percentage by weight |
|---|---|---|
| From 1250$\mu$ to | 800$\mu$ | 2.2 |
| 800$\mu$ | 500$\mu$ | 11 |
| 500$\mu$ | 315$\mu$ | 23 |
| 315$\mu$ | 200$\mu$ | 26.4 |
| 200$\mu$ | 125$\mu$ | 19 |
| 125$\mu$ | 100$\mu$ | 5.1 |
| 100$\mu$ | 40$\mu$ | 8.65 |
| 40$\mu$ | 10$\mu$ | 4.65 |
| | | 100 |

The fraction of zirconia vaporised and condensed outside is characterised by granulometries less than 10 microns.

In a general way, it may be considered that all the particles of a diameter less than 100$\mu$ are constituted from the condensed vapor. In fact, particles of large diameter are not found on the wall of the cylinder, where the certainty of having nothing but condensate is considerable. Of course the specific area of a material in grains varies as an inverse function of the diameter of the grain or of the equivalent sphere. The speed of vaporisation of a given grain increases therefore when the diameter of the latter diminishes. It is hence apparent that a certain class of grains cannot exist in suspension in the plasma, due to the fact of the low value of the diameter representing this class.

Thus, if it is considered that all the particles of granulometries less than 100$\mu$ are constituted from condensed vapors, the total fraction vaporised, in the course of the continuous operational trial, during 5 minutes, was distributed as follows:

90 g on the walls of the cylinder 53 g in the column 70 g in the recovery cone 235 g of ultra-fine powder Total: about 448 g of vaporised powder.

It is interesting to note that there are observed very distinct differences between the particles of zirconia of the class of granulometries 100$\mu$ - 40$\mu$ and that of the class 40$\mu$ - 10$\mu$. The first is constituted by individual grains, of regular shapes, sometimes spherical, having at the surface a system of very fine nicks, of small dimensions relative to the diameter of the grain. The second is constituted by grains of very jagged shapes constituted from agglomerates of grains of small diameters, having an arborescent shape, with high specific surfaces. The examination of these grains with a sufficiently powerful optical microscope reveals that the particles of the class 40$\mu$ - 10$\mu$ are in fact constituted by agglomerates of much finer particles, of the order of a micron.

There is shown in FIG. 2 a device more suitable for industrial use than the experimental device which has just been described. In this device, the plasma torches 14a, 14b, 14c of the installation in FIG. 1 are advantageously replaced by nozzles of which one has been shown diagrammatically at 54a, these nozzles being devoid of their own electrical supply but comprising conductive portions in contact with the gaseous flows which they are capable of providing. These nozzles are inserted in a circuit (not shown), normally open, comprising a common electric current supply device, this circuit being closable by means of these flows on the production in the latter of a sufficient reduction in their electrical resistance. It is known that the flow rates of these nozzles of installations of this type are variable to much greater proportions than the flow rates of plasma torches of the preceding assembly.

Assemblies such as those described in Pat. No. 1,600,278 or in the application for the certificate of addition No. 70 46416 already mentioned are usable. For example, the conductive portions of these nozzles are all inserted in a common circuit (not shown) and respectively connected to the phases of a source of polyphase current (also not shown) comprising a number of phases equal to the number of nozzles provided in the fluidising enclosure. Advantageously, the nozzle cooperates with a pilot plasma torch 56 serving both for the starting and for the maintenance of the electric arcs in the elementary flows 10a, 10b, 10c. . . supplied by the nozzles and for the recycling of the powders escaping from the fluidised bed 26. It will be noted also in this case that the particles of the fluidised bed will themselves be able if necessary to participate in the reduction of the electrical resistance required in the elementary flows, to ensure the starting of the arcs inside these elementary flows.

The enclosure 2a of the device of FIG. 2 comprises advantageously two stages, namely a first stage 58, in its lower portion, in which the fluidisation proper of the material to be treated under the conditions already described is effected and, in the upper portion of the apparatus, a second stage 60 for tempering the condensation of the vapors escaping from the stage 58. This tempering can be facilitated by the injection of an inert chilling gas into the separating zone 62 of the two stages, by means of injectors 63, these gases, entrained towards the top of the apparatus by the hot gases of the principal plasma flow, then ensuring both the condensation of the vapors and their entrainment upwardly and towards a separating device diagrammatically shown at 64 (for example an electrostatic or cyclone separator) where the ultra-fine powders obtained can be collected. The adjustment of the flow of tempering gases introduced into the enclosure enables especially the granulometry of the condensed vapors to be influenced.

As regards the supply of the powder of the fluidising stage, it will advantageously have recourse to a cooled pipe 66 passing through the tempering stage just into the upper portion of the fluidising stage, so that the gaseous current rising into the tempering stage does not interfere with the supply of the fluidising stage, by gravity, from the funnel 38. In preferred constructions of this type of device, the funnel 28 is closed and communicates with a supply connector 68 for a carrier gas which contributes to the introduction of the powder into the fluidising stage. This carrier gas also avoids the risks of clogging of the cooling current end by molten refractory material.

Considering that the nozzles enable, as described in U.S. Pat. No. 1,600,268, the use of gaseous flow rates in elementary flows much greater than is possible to obtain with plasma torches, and that there is thus effected a much more precise supply of the fluidising bed, it is noted that:

the possible use of large volumes of plasma is also better adapted to the production of refractory fluidised beds of material;

the vaporisation yield is very high, and this all the greater as the diameter of the enclosure is greater, considering that the losses of materials and of heat, inevitable on contact with the walls, will be reduced to equivalent proportions;

that a high flexibility of operation of the apparatus is obtained, taking into account the possibility of adjusting in independent manner the operating characteristics of the apparatus as follows:

flow rate or enthalpy of the plasma power of the plasma geometrical characteristics of the resulting flow of plasma interelectrode distance intensity of the electric current inclination of the electrodes.

In particular, it will be appreciated that the position of the fluidising bed in the enclosure is adjustable, hence the zone of temperatures in which the fluidising bed is effected, for example, either by adjusting the flow rates of the nozzles, hence the velocity of the flow of the gases in the principal flow, or, when possible, by selecting the granulometries of the starting materials. In both cases, the minima and maxima velocities of fluidisation of the material in the heart of the principal flow are brought into play.

The reactor according to the invention also lends itself well to the treatment of powders whose granulometries vary over wide ranges, the reactor then being of integral type.

The invention is capable of numerous applications, other than simple vaporisation — in the heart of an inert gaseous flow — of refractory materials which has been more particularly envisaged in the foregoing.

It is applicable, for example, to the heat treatment of particles for the purpose of obtaining their crystalline conversion, for example, to modify the mechanical properties of the materials concerned, the crystalline structure given when hot to these materials being preserved by the later tempering of the particles for the manufacture of solid solutions at high temperatures from mixtures of the subsequent constituents of these solid solutions, for the vaporisation of mixtures of powders and the fractionated condensation of the vapors obtained, to obtain phases enriched in one of the constituents of the starting mixture, to the decomposition of natural materials or minerals, for example of zirconium silicate or "zircon" which decomposes into silica, into zirconia and into impurities; in this particular case the later separation of the various constituents is easily realisable mechanically, for the production of deposits from a vapor phase, for chemistry at high temperatures, which brings into play heterogeneous reactions between the fluidised solid phase and the hot gaseous phase provided by the flows, etc.

As is self-evident, and as emerges already from the foregoing, the invention is in no way limited to those of its types of application, nor to those embodiments of its various parts, which have been more especially indicated; it encompasses, on the contrary, all variations.

We claim:

1. A method for the production of ultra fine refractory particles from a refractory material in the form of relatively coarse particles which comprises generating a plurality of upwardly directed plasma flows in the lower portion of a vertical enclosure, the direction of said plasma flows being oriented to converge at a point substantially at the vertical axis of said enclosure to form a principal flow of hot gases moving upwards, said gases having a temperature above the vaporization temperature of said refractory particles, causing an electric current to flow through said convergent flows in an arc across the bottom of the enclosure at an energy level of at least about 38.5 kw, introducing said refractory coarse particles by gravity into said principal flow of hot gases above said point of convergence, controlling the orientations and the flow rates of said plasma flows and the electrical energy dissipated therein to impart to said principal flow a flared shape terminating in a cross-section substantially equal to the internal diameter of said enclosure, said plasma flows having a sufficiently reduced speed so as to form a fluidized bed of said refractory particles therein, and to ensure that the hot gases have a temperature higher than the vaporization temperature of said refractory material, controlling the rate of introduction of said refractory material in said plasma flow to allow for the vaporization of at least part of said coarse refractory particles in the fluidized bed, and removing hot gases containing vaporized refractory materials and fine refractory particles entrained therein from above said fluidized bed.

2. Method according to claim 1, wherein the powder is introduced into the principal flow by means of an auxiliary gaseous current converging with the principal flow.

3. Method according to claim 2, wherein the auxiliary gaseous current is itself constituted by a plasma flow.

4. Method according to claim 1, wherein an auxiliary gaseous current is injected into the enclosure, at its bottom, at a flow rate adapted to entrain into the principal flow particles present in the bottom of the enclosure.

5. Method according to claim 1, wherein there is injected into the enclosure, above the principal flow, gases for the tempering and condensation of the vapors formed in the fluidised bed formed in the principal flow, the gases from the latter entraining the tempering gases and condensed vapors towards an outside of the enclosure, through the opening formed in its upper portion.

6. Method according to any one of claim 1, wherein at least partial vaporisation of the refractory powders is effected.

7. Method according to claim 1, wherein a vertical enclosure is used, open in its upper portion.

8. Method according to claim 7, wherein the walls of the enclosure are cooled.

9. A method for the production of ultra fine refractory particles from a refractory material in the form of relatively coarse particles which comprises generating a plurality of upwardly directed plasma flows in the lower portion of a vertical enclosure, the direction of said plasma flows being oriented to converge at a point substantially at the vertical axis of said enclosure to form a principal flow of hot gases moving upwards, said gases having a temperature above the vaporization temperature of said refractory particles, causing an electric current to flow through said convergent flows in an arc across the bottom of the enclosure at an energy level of at least about 38.5 kw, introducing said refractory coarse particles into said principal flow of hot gases above said point of convergence, controlling the orientations and the flow rates of said plasma flows and the electrical energy dissipated therein to impart to said principal flow a flared shape terminating in a cross-section substantially equal to the internal diameter of said enclosure, said plasma flows having a sufficiently reduced speed so as to form a fluidized bed of said refractory particles therein, and to ensure that the hot gases have a temperature higher than the vaporization temperature of said refractory material, controlling the rate of introduction of said refractory material in said plasma flow to allow for the vaporization of at least part of said coarse refractory particles in the fluidized bed, and removing hot gases containing vaporized refractory materials and fine refractory particles entrained therein from above said fluidized bed.

* * * * *